(12) United States Patent
Kim

(10) Patent No.: US 10,062,298 B2
(45) Date of Patent: Aug. 28, 2018

(54) EDUCATION KIT FOR OPEN HARDWARE

(71) Applicant: Korea University Research and Business Foundation, Seoul (KR)

(72) Inventor: Sughui Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 291 days.

(21) Appl. No.: 15/005,416

(22) Filed: Jan. 25, 2016

(65) Prior Publication Data
US 2016/0225281 A1 Aug. 4, 2016

(30) Foreign Application Priority Data
Jan. 29, 2015 (KR) .................. 20-2015-0000694 U

(51) Int. Cl.
*G09B 19/00* (2006.01)
*G09B 23/18* (2006.01)

(52) U.S. Cl.
CPC ......... *G09B 19/0053* (2013.01); *G09B 23/18* (2013.01)

(58) Field of Classification Search
USPC ...... 434/224, 379, 393; 439/43, 54; 446/484
See application file for complete search history.

(56) References Cited

U.S. PATENT DOCUMENTS

| 2,390,706 | A | * | 12/1945 | Hearon | G09B 23/185 29/825 |
| 2,592,552 | A | * | 4/1952 | De Florez | G09B 23/185 174/69 |
| 3,175,304 | A | * | 3/1965 | Och | G09B 23/185 434/224 |
| 4,039,236 | A | * | 8/1977 | Schepler | H01R 9/28 361/760 |
| 4,457,721 | A | * | 7/1984 | Charvolin | G09B 23/185 434/224 |
| 6,910,894 | B2 | * | 6/2005 | Basconi | G09B 1/02 174/260 |
| 7,611,357 | B2 | * | 11/2009 | Han | H01R 11/30 434/224 |
| 8,991,040 | B2 | * | 3/2015 | Chen | H01R 9/28 29/592.1 |
| 9,812,034 | B2 | * | 11/2017 | Shim | G09B 23/185 |
| 2004/0096812 | A1 | * | 5/2004 | Goh | G09B 23/185 434/379 |
| 2004/0229489 | A1 | * | 11/2004 | Lu | G09B 23/181 439/214 |
| 2005/0036264 | A1 | * | 2/2005 | Aguilar | H01F 7/0242 361/143 |
| 2009/0298023 | A1 | * | 12/2009 | Kim | G09B 23/183 434/224 |

FOREIGN PATENT DOCUMENTS

| KR | 20-0306980 | 12/2002 |
| KR | 100730801 B1 | 6/2007 |
| KR | 101411932 B1 | 6/2014 |

* cited by examiner

*Primary Examiner* — Kurt Fernstrom
(74) *Attorney, Agent, or Firm* — Fox Rothschild LLP

(57) ABSTRACT

An open hardware education kit is provided. The open hardware education kit comprises an expansion board. The expansion board comprises a plurality of metal terminals joinable with a magnet, a plurality of conductive connection wires respectively connected with the metal terminals, and a plurality of pin headers respectively connected with the connection wires. The plurality of pin headers are joinable with an expansion header of open hardware.

5 Claims, 7 Drawing Sheets

PIN INFORMAITON

EDUCATION KIT FOR OPEN HARDWARE

CROSS-REFERENCE TO RELATED APPLICATIONS

A claim for priority under 35 U.S.C. § 119 is made to Korean Utility Model Application No. 20-2015-0000694 filed Jan. 29, 2015, in the Korean Intellectual Property Office. The entire contents of this application are hereby incorporated by reference.

BACKGROUND

Statement of the Technical Field

The present document relates to an education kit for open hardware. More particularly, the present document relates to an open hardware education kit capable of facilitating GPIO connection which is provided by open hardware and facilitating a circuit configuration using the open hardware.

Description of the Related Art

Hardware fabrication using open hardware is growing violent. Open hardware is generally comprised of System-on-Chip (SoC) and provides General Purpose Input Output (GPIO) for external input/output interfaces. GPIO can be set to be digital input and output, and analog input and output, or to be digital or analog input/output. Open hardware is a Raspberry pi board or includes a board such as an Arduino board. Open hardware must be regarded as including distributed boards and open source hardware may be regarded as including software sources which are available in such hardware. Therefore, open hardware conceptually includes open source hardware. Using open hardware, an educatee or user is able to configure diverse circuits or to compose many programs. In configuring a desired circuit, it is necessary to exactly know input/output positions which are provided from open hardware.

FIGS. 1A and 1B respectively show the top and bottom planes of general open hardware. FIG. 1A shows a pattern of the top plane of the open hardware and FIG. 1B shows a pattern of the bottom plane of the open hardware.

As shown in FIGS. 1A and 1B, the open hardware is used to provide an expansion header for configuration of a specific circuit and an additional circuit of the open hardware is formed using a general bread board.

To connect open hardware with a bread board and to form a circuit with open hardware, it is essential to know and confirm information about pins of an expansion header. However, as can be seen from FIGS. 1A and 1B, because the top header has not any information about pins, it needs to turn the back plane for information of the pins. In some cases, insufficient pin information and small connection holes make beginners difficult in completing pin connections.

As such, in forming a specific circuit through open hardware, it is necessary for facilitating information acquirement and connection to pins of an expansion header. Moreover, it is not easy for beginners of open hardware even to use a well-known bread board. Especially, as the bread board does not provide its internal connection configuration to the external, a first user handling open hardware can hardly form a circuit configuration and cannot intuitively find what kind of a circuit is made therein.

Therefore, there is a need of providing an open hardware education kit allowing beginners to easily form circuits for specific configurations therewith.

SUMMARY

The present disclosure concerns an open hardware education kit intuitively providing pin information of an expansion header of open hardware and allowing easy circuit configuration.

In some scenarios, an open hardware education kit may include an expansion board comprising a plurality of metal terminals joinable with a magnet, a plurality of conductive connection wires connected respectively to the plurality of metal terminals, and a plurality of pin headers connected respectively to the plurality of connection wires. The plurality of pin headers may be joinable with an expansion header of open hardware.

In those or other scenarios, an open hardware education kit may allow a user to intuitively know pin information of an expansion header of open hardware, and to easily form a circuit therewith.

BRIEF DESCRIPTION OF THE FIGURES

The above and other objects and features will become apparent from the following description with reference to the following figures, wherein like reference numerals refer to like parts throughout the various figures unless otherwise specified.

DETAILED DESCRIPTION

Figure 1A:
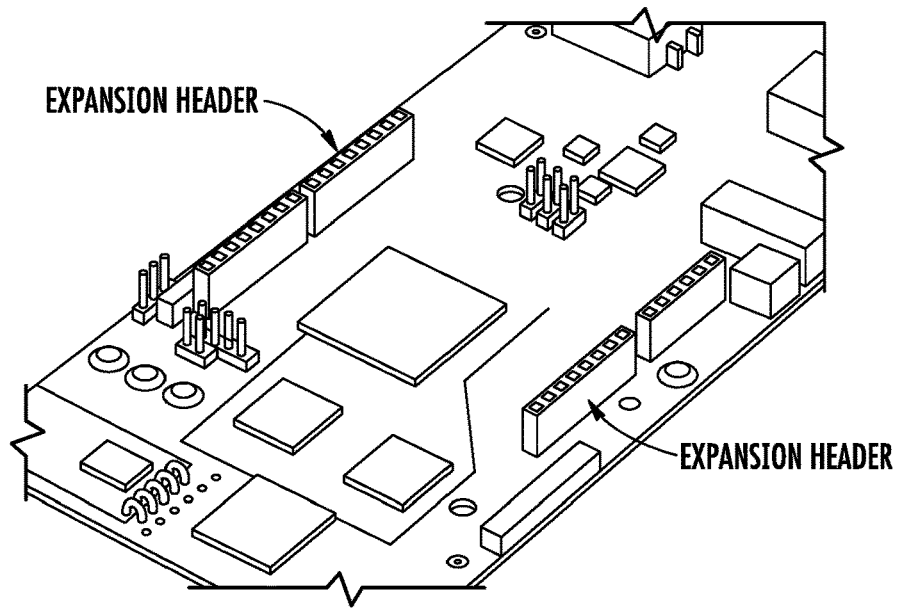
FIGS. 1A and 1B exemplarily show external patterns of the top and bottom planes of general open hardware.
Figure 1B:
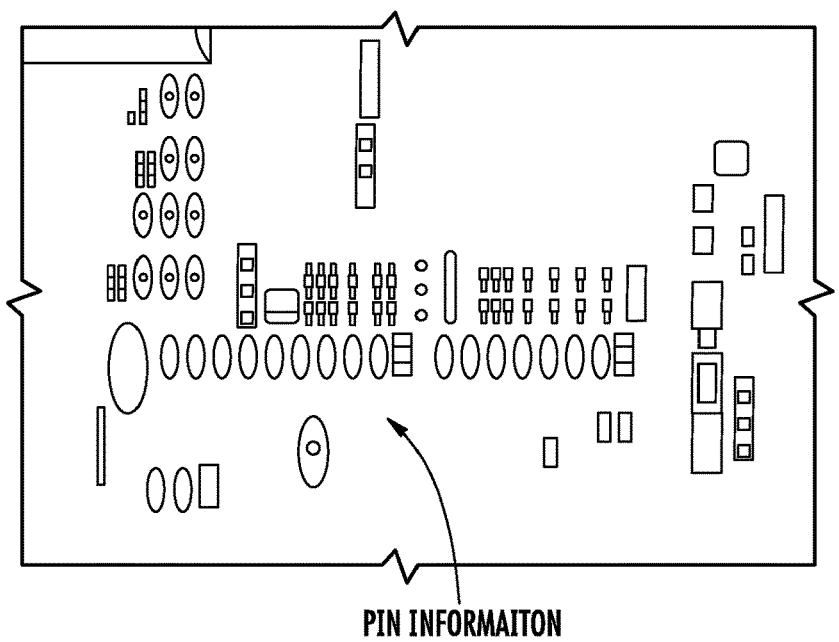

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

The present disclosure concerns an open hardware education kit allowing more facilitation in intuitively forming a circuit by expanding open hardware which is known or distributed in general. An education kit according to the inventive concepts may be formed of a multiplicity of elements allowing an educatee or user to intuitively confirm and easily connect a GPIO, which is provided from a board of open hardware, with another board. The education kit may include an expansion board 100, and may further include a bread board 200 and a jumper wire 300 for connecting the expansion board 100 with the bread board 200. The jumper wire 300 may function as a connection element for the bread board 200 according to the inventive concepts.

Figure 2A:
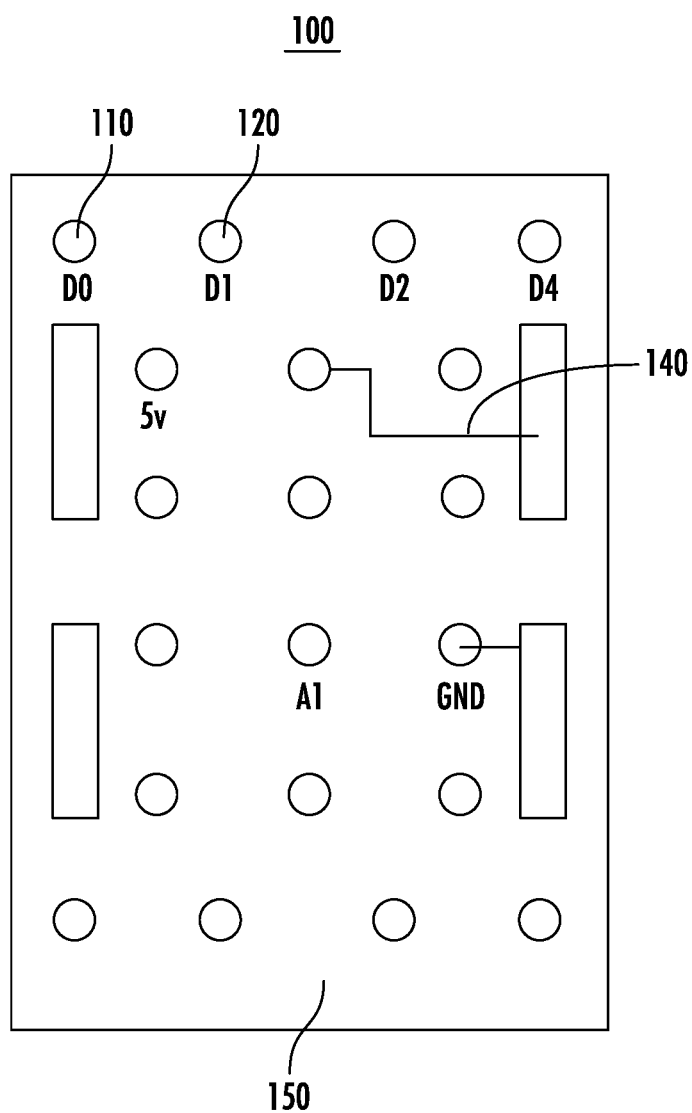
FIGS. 2A and 2B exemplarily show external patterns of the top and bottom planes of an expansion board according to the inventive concepts.
Figure 2B:
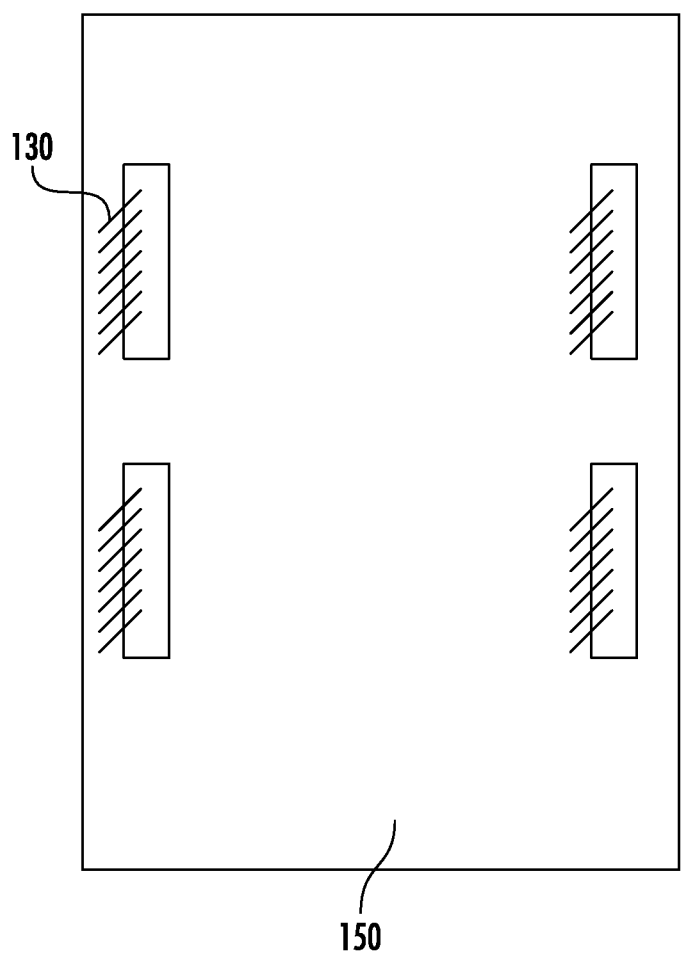
Figure 3:
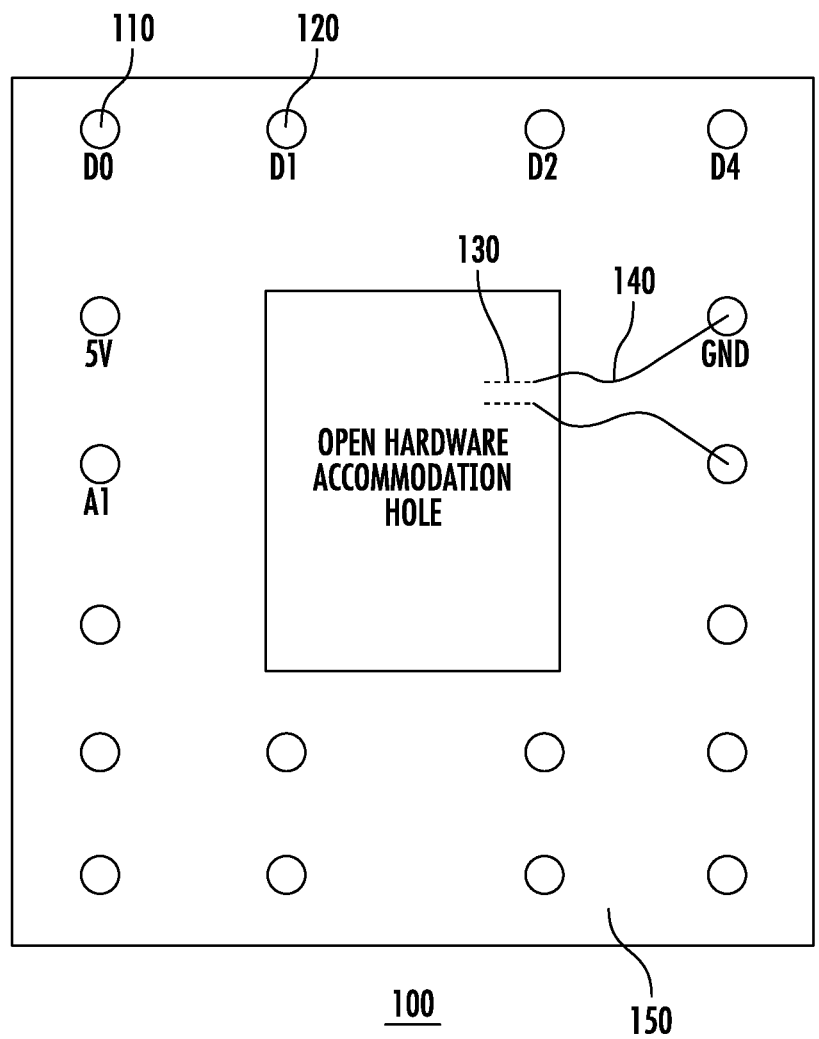
FIG. 3 exemplarily shows another external pattern of an expansion board according to the inventive concepts.

In regard to elements of the education kit, FIGS. 2A, 2B, and 3 show exemplary external patterns of the expansion board 100.

As can be seen from FIGS. 2A, 2B, and 3, the expansion board 100 may at least include a plurality of metal terminals 110, a plurality of pin information 120 which is displayed, a plurality of pin headers 130, and a plurality of connection wires 140, and may additionally include a PCB board or a board plate 150 made of an insulator (e.g., plastic or acryl).

For elements of the expansion board 100, referring to FIGS. 2A, 2B, and 3, the metal terminal 110 may be joinable with a magnet and may be connected with a specific pin of an expansion header of the open hardware. The plurality of metal terminals 110 may be respectively connected with specific pins of the expansion header of the open hardware. The metal terminals 110 may be properly fixed to the top plane of the expansion board 100. The metal terminal 110 may contain a component joinable with (attachable to) a magnet. The metal terminal 110 may contain, for example, chrome plating, iron, or a nonferrous metal. The metal terminal 110 may be a screw joinable with or separable from the board plate 150 of the expansion board 100, or a metal pad built in a body with the board plate 150. The metal terminal 110 may be shaped in a round or tetragon. In some scenarios, the metal terminal 110 corresponds with the jumper wire 300 in shape.

The displayed pin information 120 may indicate information about specific pins of the expansion header of the open hardware connected with the metal terminals 110 corresponding thereto. The pin information 120 may be displayed on the surface of the board plate 150 by a black ink or others. The pin information 120 may be displayed at positions adjacent to the metal terminals 110 and thereby a user may be able to intuitively obtain information about corresponding pins.

The pin header 130 may be joined with a pin of the expansion header of the open hardware. The pin header 130 may include a conductive metal component and may further include insulation components (e.g., plastic) which electrically isolates a metal component from another metal component. Pin types available for expansion are generally a male type and a female type. If pins of the expansion header are formed in the male type, the pin header 130 of the expansion board 100 may have the female type. In the other case, the pin header 130 of the expansion board 100 may have the male type.

The plurality of pin headers 130 may be joinable with pins of the expansion header of the open hardware. The pin header 130 may be formed in a body together with the board plate 150 (FIG. 2B). Otherwise, the pin header 130 may be connected with the connection wire 140 but may not be joined with the board plate 150. In the same manner, the plurality of pin headers 130 may be joined with a plurality of pins of the expansion header.

The connection wire 140 may contain a conductive component such as copper and may connect the metal terminal 110 with the pin header 130. The connection wire 140 may also transfer an electric signal between the metal terminal 110 and the pin header 130. As such, each of the connection wires 140 may have a conductive component to transfer an electric signal between the metal terminal 110 and the pin header 130 which correspond thereto.

The connection wire 140 may be installed in the board plate 150 of the expansion board 100 or on the board plate 150. For example, the connection wire 140 may be formed with a PCB pattern in the board plate 150 such as PCB. Otherwise, the connection wire 140 may be fixed on the board plate 150 in a form of electric wire with a jacket.

The board plate 150 may be made of acryl, plastic, or PCB, supporting the open hardware, and may allow the open hardware to be connected with the bread board 200. The board plate 150 may be larger than the open hardware in size and may be connected with the bread board 200 through the metal terminal 110 and the jumper wire 300.

As shown in FIGS. 2A, 2B, and 3, the expansion board 100 may allow a user of open hardware to intuitively know the pin information 120 of expansion terminals of the open hardware and to easily conduct pin connection therewith.

Figure 4:
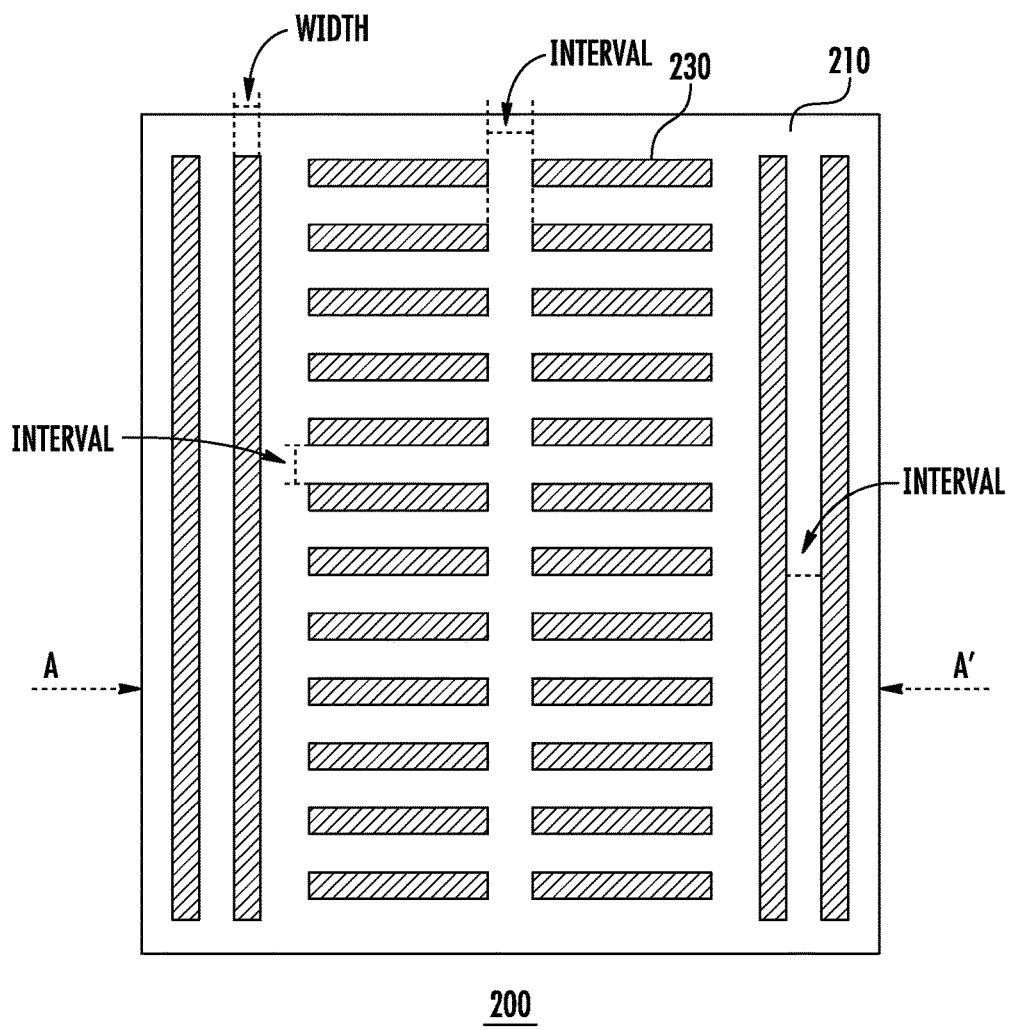
FIG. 4 exemplarily shows an external pattern of a bread board according to the inventive concepts.

FIG. 4 exemplarily shows an external pattern of a bread board. The bread board 200 of FIG. 4 may be connected with open hardware through the expansion board 100 shown in FIGS. 2A, 2B, and 3. The bread board 200 may be connectable with specific pins of an expansion header of open hardware and thereby a specific circuit may be completed through the connected pins.

As can be seen from FIG. 4, the bread board 200 may include an insulation layer 210 and a plurality of conductive pads 230 which are placed on the insulation layer 210 and isolated each other. The insulation layer 210, for example, may be formed of a plastic (plate) containing a component of synthetic resin and may isolate a metal layer, which will be described with reference to FIG. 5, from the external. As such, the insulation layer 210 may be formed of a component through which an electric signal cannot be conducted.

The conductive pads 230 may be placed on the insulation layer 210 and may be joined directly with the insulation layer 210. For example, the conductive pads 230 may be directly attached to a plastic plate of the insulation layer 210 through a joining material (e.g., an adhesive, etc.). The conductive pads 230 may be formed of a highly conductive metal, e.g., nonferrous metal such as copper. The conductive pads 230 may be formed of a copper tape.

As can be seen from FIG. 4, a plurality of the conductive pads 230 may be shaped in lines. The conductive pads 230 may be formed to transfer electric signals between elements in circuit configuration of the bread board 200. Accordingly, two elements connected with the same one of the conductive pads 230 may exchange an electric signal between each other. Electric signals of several conductive pads 230 may be transferred through elements connected with those several conductive pads 230.

A width of the conductive pad 230 may be preliminarily determined. For example, a width of the conductive pad 230 may be determined in proportion to a diameter or partial size of a magnet terminal 310 of a jumper wire 300 employed in the bread board 200, or its proportional size. Additionally, an interval between adjacent ones of the conductive pads 230 may be set larger than the diameter or partial size of the magnet terminal 310. A length of the conductive pad 230 may be variable dependent on a design of the bread board 200. For example, a specific group of the conductive pads 230 (the vertically arranged conductive pads 230 in FIG. 4) may be longer than the other group of the conductive pads 230 (the horizontally arranged conductive pads 230 in FIG. 4).

As an interval between the conductive pads 230 is formed larger than a size of a terminal of the jumper wire 300, it may be possible to prevent an inadvertent short-circuit of the conductive pads 230 in accordance with placement of the jumper wire 300.

As shown in FIG. 4, the plurality of conductive pads 230 may be directly exposed to a user. The user is able to intuitively form and know a basic configuration of connection of the bread board 200 from the arrangement of the conductive pads 230

Figure 5:
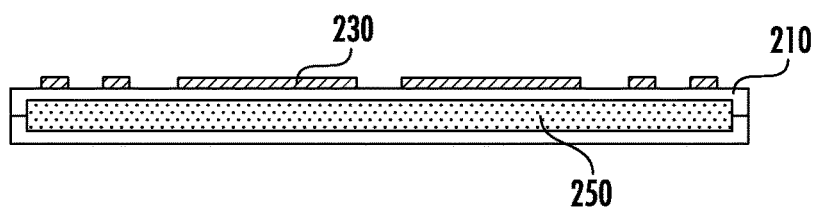
FIG. 5 shows a section of a bread board according to the inventive concepts.

FIG. 5 shows a section of a bread board. The section of FIG. 5 is taken by AA' of FIG. 4. As can be seen from FIG. 5, the bread board 200 may further include a metal later 250 therein. As also shown in FIG. 5, an insulation layer 210 is placed on the metal layer 250 of the bread board 200. A plastic plate of the insulation later 210 may be formed of a case (an implemental material) to protect the metal layer 250 from the external.

The metal layer 250 may include a metal joinable with a magnet. The metal layer 250 may be joined with an external magnet out of the insulation layer 210 through a metal component, which is well attachable to a magnet, to fix a jumper wire 300 and other elements of the inventive concepts to the bread board 200. The metal layer 250, for example, may be made of a tin plate containing tin, or an iron plate. The metal layer 250 may be embedded in a case of the bread board 200 in a form of plate.

As such, for the purpose of connection with elements to be mounted thereon according to a circuit configuration, the bread board 200 may allow the jumper wire 300, which is equipped with a magnet terminal 310, to join with the metal layer 250 which is placed under a conductive pad 230.

Figure 6:
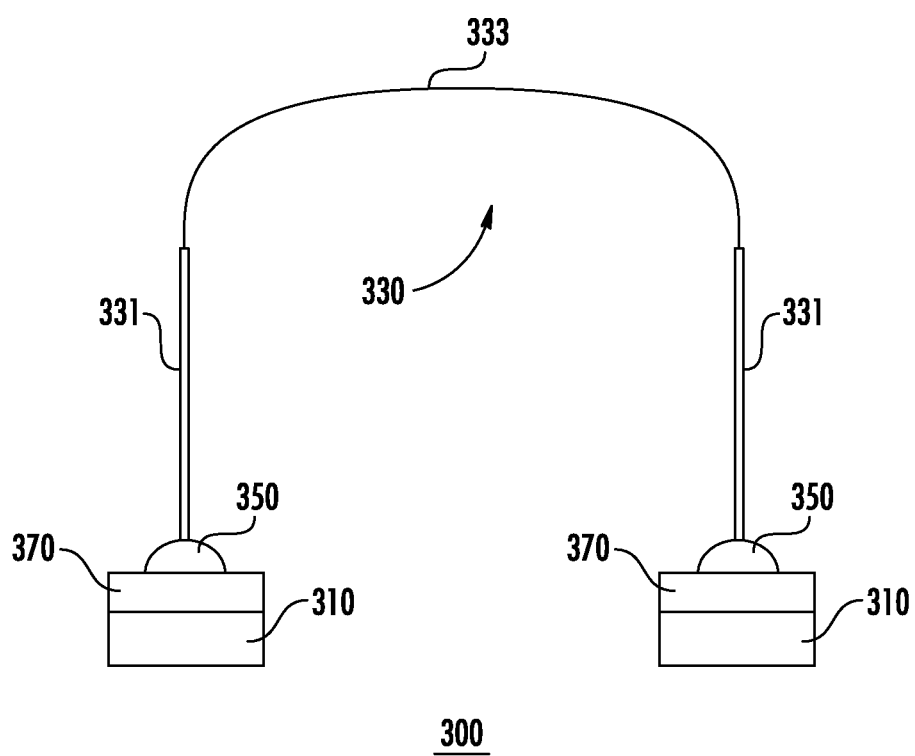
FIG. 6 exemplarily shows a jumper wire for connecting a bread board with an expansion board.

FIG. 6 exemplarily shows a jumper wire 300 for connecting a bread board with an expansion board. The jumper wire 300 of FIG. 6 may indicate an exemplary jumper wire 300 for signal transfer between the bread board 200 and the expansion board 100. The jumper wire 300 may include two magnet terminals 310 and a connection wire 330. The jumper wire 330 may further include a solder 350 for connecting the magnet terminal 310 and the connection wire 330, and a metal terminal 370 placed between the solder 350 and the magnet terminal 310.

In regard to the configuration of the jumper wire 300 for the bread board 200, the magnet terminal 310 may be formed of a magnetic material through which the magnet terminal 310 is joined with the metal layer 250 of the bread board 200 or the metal terminal 110 of the expansion board 100. The jumper wire 300 may include at least two magnet terminals 310. One of the magnet terminals 310 may be joined with a specific metal terminal 110 of the expansion board 100 while the other of the magnet terminal 310 may be joined with the metal layer 250 of the bread board 200.

The magnet terminal 310, for example, may be formed of a neodymium magnet. The magnet terminal 310 may be molded in a shape of cylinder or rectangular parallelepiped. A diameter of the magnet terminal 310 or a length of a specific plane of the rectangular parallelepiped may be utilized in setting a width (thickness) and an interval of the conductive pads 230 of the bread board 200.

The metal terminal 370 of the jumper wire 300 may be joined with the magnet terminal 310 to transfer an electric signal and to allow the solder 350 to be joined therewith through a soldering. The metal terminal 370 may be formed in the same pattern with the magnet terminal 310 and may be made of iron as a main component which is easy in transferring an electric signal and soldering. The metal terminal 370 may be excluded therefrom in accordance with a modification of the jumper wire 300.

The solder 350 comprised in jumper wire 300 may join the connection wire 330 with the magnet terminal 310 (directly or through the metal terminal 370) to allow electric signal transfer. The solder 350 may be formed by a soldering process. General lead may be even used to connect an electric wire with the magnet terminal 310. For a direct soldering to the magnet terminal 310, it needs to use a lead, which has a low melting point, in accordance with a component of the magnet terminal 310.

For example, in the case with a neodymium magnet, the magnetism is lost at temperature over 300° C. Accordingly, a soldering for joining the magnet terminal 310 with the connection wire 330 according to the inventive concepts may be formed at a low melting point (e.g., 180° C.). For example, a low melting-point lead may be a lead free or a Sn—Ag—Cu based lead free. Such a low melting-point lead may be employed to form the solder 350 for joining the connection wire 330 with the magnet terminal 310. Otherwise, for allowing a normal lead to be used for a soldering, it may be permissible to join the metal terminal 370 with the magnet terminal 310 by inserting and soldering the metal terminal 370, which is available for the soldering, between the magnet terminal 310 and the solder 350. It may be also permissible to join a metal with a magnet through a shrinkable tube.

The connection wire 330 may transfer an electric signal between the magnet terminals 310. As shown in FIG. 6, the connection wire 330 may include a flexible electric wire 333 and a rigid electric wire 331. The rigid electric wire 331 may be formed to be hardly flexible and the flexible electric wire 333 may be variably shaped by a user. The rigid electric wire 331 may be formed to transfer an electric signal between the solder 350 and the flexible electric wire 333. The flexible electric wire 333 may be formed to transfer an electric signal between both of the rigid electric wires 331.

Figure 7:
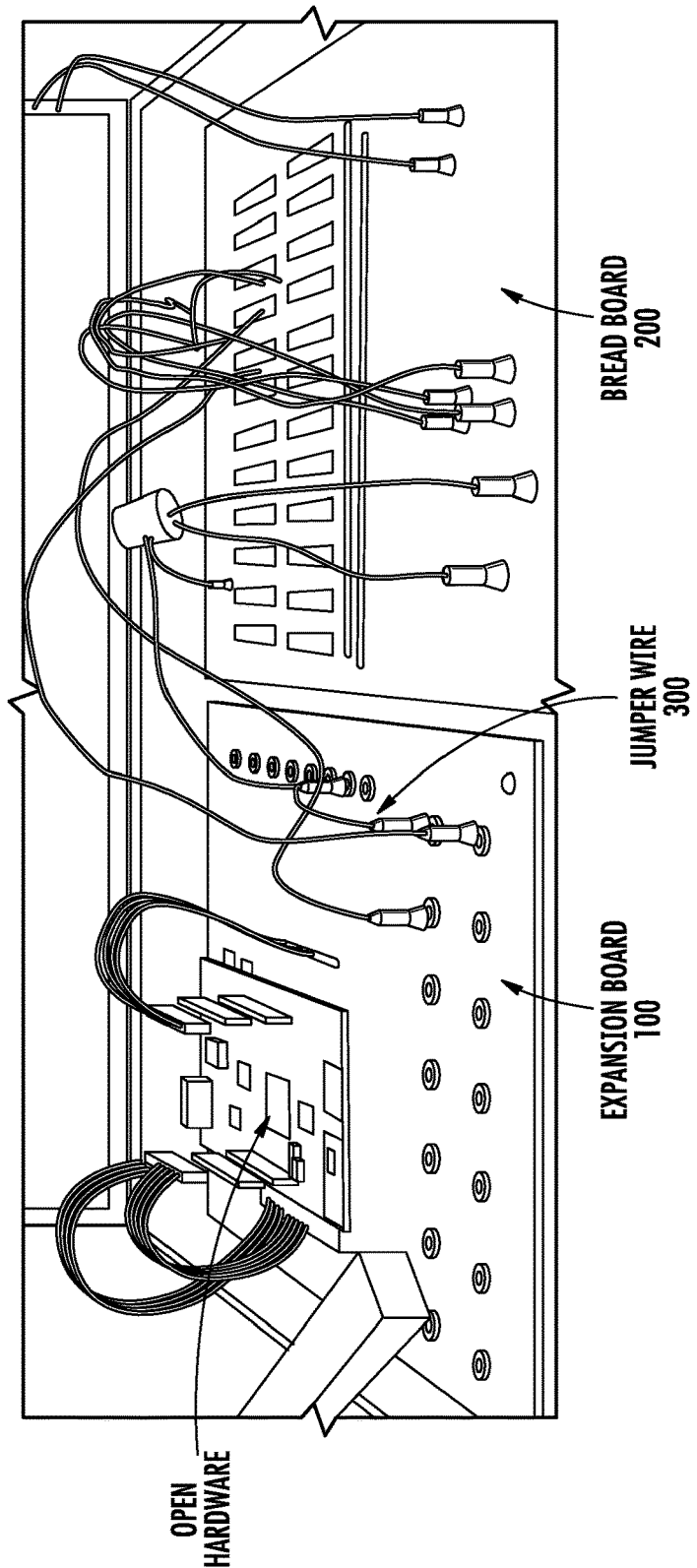
FIG. 7 shows a prototype of an open hardware education kit formed according to the inventive concepts.

FIG. 7 shows a prototype of an open hardware education kit. A prototype of the education kit of FIG. 7 may include open hardware, a bread board 200, an expansion board 100, and one or more jumper wires 300 for connecting the bread board 200 with the expansion board 100. The prototype of FIG. 7 may also further include a jumper wire for connecting the bread board 200 with a circuit part.

Different from the jumper wire 300 for connecting the expansion board 100 of FIG. 6, the jumper wire for a circuit part may include a single one of the magnet terminal 310. At the opposite side of the one magnet terminal 310, a connection terminal may be provided for connecting an element. This connection terminal may be connected with a terminal of an element to transfer an electric signal. The connection terminal may be formed in a male type or a female type.

As can be seen from the prototype of FIG. 7, the bread board 200 may be connected with a metal terminal 110 of the expansion board 100 through the jumper wire 300. The metal terminal 110 of the expansion board 100 may be connected with a specific pin (e.g., a GPIO pin) of the open hardware through a pin header 130. Using this configuration, a user is able to directly confirm specific pin information of the open hardware from pin information 120 of the expansion board 100, to intuitively know a state of circuit connection through conductive pads 230, and thereby to easily form a circuit, without hesitation, through the jumper wire 300 utilizing magnetism.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An open hardware education kit comprising an expansion board, the expansion board comprising:
   a plurality of metal terminals joinable with a magnet;
   a plurality of conductive connection wires respectively electrically connected to the plurality of metal terminals; and
   a plurality of pin headers respectively electrically connected to the plurality of conductive connection wires via a printed or applied conductive material,
   wherein the plurality of pin headers is joinable with an expansion header, the expansion header comprising a connector which is configured to expand functionality of a circuit board.

2. The open hardware education kit of claim 1, wherein the expansion board comprises a display of information about pins of the expansion header connected with the metal terminals.

3. The open hardware education kit of claim 1, further comprising
   one or more jumper wires to connect the expansion board with a bread board,
   wherein the jumper wires comprise a first magnet terminal, a second magnet terminal, and a connection wire transferring an electric signal between the first magnet terminal and the second magnet terminal.

4. The open hardware education kit of claim 3, further comprising
   a bread board configured to transfer an electric signal through the expansion board and the bread-board specific jumper wire,
   wherein the bread board comprises a metal layer joinable with a magnet, an insulation later placed on the metal layer, and a plurality of conductive pads placed on the insulation later.

5. The open hardware education kit of claim 4, wherein each width of the plurality of conductive pads is formed in a specific width and an interval between adjacent conductive pads is larger than the specific width.

* * * * *